United States Patent
Wolff et al.

(10) Patent No.: US 8,121,873 B1
(45) Date of Patent: Feb. 21, 2012

(54) RAPID CATEGORIZATION OF DATA CENTER SERVICEABILITY CHARACTERISTICS

(75) Inventors: Alan S. Wolff, Louisville, CO (US);
Jeffrey S. Demoff, Littleton, CO (US);
William F. Hunter, Denver, CO (US)

(73) Assignee: Oracle America, Inc., Redwood City, CA (US)

( * ) Notice: Subject to any disclaimer, the term of this patent is extended or adjusted under 35 U.S.C. 154(b) by 1350 days.

(21) Appl. No.: 11/497,905

(22) Filed: Aug. 1, 2006

(51) Int. Cl.
*G06Q 30/00* (2006.01)

(52) U.S. Cl. .................. 705/7; 705/10; 705/14; 705/26; 705/35

(58) Field of Classification Search .................... 705/10, 705/14, 26, 35, 7
See application file for complete search history.

(56) References Cited

U.S. PATENT DOCUMENTS

| | | | |
|---|---|---|---|
| 2001/0014868 A1* | 8/2001 | Herz et al. | 705/14 |
| 2002/0161664 A1* | 10/2002 | Shaya et al. | 705/26 |
| 2003/0037041 A1* | 2/2003 | Hertz | 707/1 |
| 2003/0208399 A1* | 11/2003 | Basak et al. | 705/14 |
| 2003/0212619 A1* | 11/2003 | Jain et al. | 705/35 |

OTHER PUBLICATIONS

Cutler, A., Breiman, L., "Archetypal Analysis," Technometrics, Nov. 1994, vol. 36, No. 4, pp. 338-347.

* cited by examiner

*Primary Examiner* — Nga B. Nguyen
(74) *Attorney, Agent, or Firm* — Osha • Liang LLP

(57) ABSTRACT

In one embodiment, a method and apparatus for rapid categorization of data center serviceability characteristics is disclosed. The method includes identifying one or more variables of interest relating to serviceability of data centers, identifying one or more archetypal data center patterns using historical data for the one or more variables of interest, wherein the one or more archetypal data center patterns do not include mythical measurements, collecting data for the one or more variables of interest from a target data center, and determining a best match of the collected data from the target data center to one of the archetypal data center patterns. Other embodiments are also disclosed.

10 Claims, 3 Drawing Sheets

US 8,121,873 B1

RAPID CATEGORIZATION OF DATA CENTER SERVICEABILITY CHARACTERISTICS

FIELD OF INVENTION

An embodiment of the invention relates to information technology systems, and more specifically, to rapid categorization of data center serviceability characteristics.

BACKGROUND OF INVENTION

Assessment of data center configurations and serviceability requirements is an important aspect of determining what services are required, how to deliver them, and how to price service level agreements. Full-scale assessments, requiring a professional services engagement can be cost-prohibitive and time consuming. On the other hand, cursory (or a non-existent) assessments can fail to take into account factors that will affect an organization's ability to adequately and profitably service the customer.

One procedure that may be utilized to provide an assessment of data center configuration and serviceability is a discriminate analysis. A discriminate analysis is a standard statistical technique that determines best fits of data samples to particular factors of the data center. However, discriminate analysis can result in "mythical" or impossible measures.

For instance, an example that illustrates this concept comes from an actual case study in which the Swiss Army wanted to determine whether there were "pure types" of facial structures so they could design face masks that would its soldiers. An attempt to identify principal components in a set of facial measurements resulted in mythological factors that did not correspond to any real or fictitious faces in the real world. For example, one statistical grouping from the analysis resulted in faces with negative distances between two points on the head. Clearly, such a measurement is impossible to achieve on a human face.

Discriminate analysis, along with many other types of statistical techniques, result in groupings that may fit the data perfectly but otherwise are not realistic measurements. Furthermore, these techniques may be time-consuming and cost prohibitive to run. As a result, a mechanism which rapidly and cost-efficiently characterizes the serviceability characteristics of a data center to avoid the pitfalls discussed above would be beneficial.

SUMMARY OF INVENTION

The present invention includes novel methods and apparatus for rapid categorization of data center serviceability characteristics.

According to one embodiment of the invention, a method is disclosed. The method includes identifying one or more variables of interest relating to serviceability of data centers, identifying one or more archetypal data center patterns using historical data for the one or more variables of interest, wherein the one or more archetypal data center patterns do not include mythical measurements, collecting data for the one or more variables of interest from a target data center, and determining a best match of the collected data from the target data center to one of the archetypal data center patterns.

According to another embodiment of the invention, an apparatus is disclosed. The apparatus includes a database of historical data center information and an archetypal analysis processing module. The archetypal analysis processing module is further to receive as input one or more variables of interest relating to serviceability of a target data center, identify one or more archetypal data center patterns using the historical data center information for the one or more variables of interest, wherein the one or more archetypal data center patterns do not include mythical measurements, receive as input data for the one or more variables of interest from the target data center, and determine a best match of the collected data from the target data center to one of the archetypal data center patterns.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
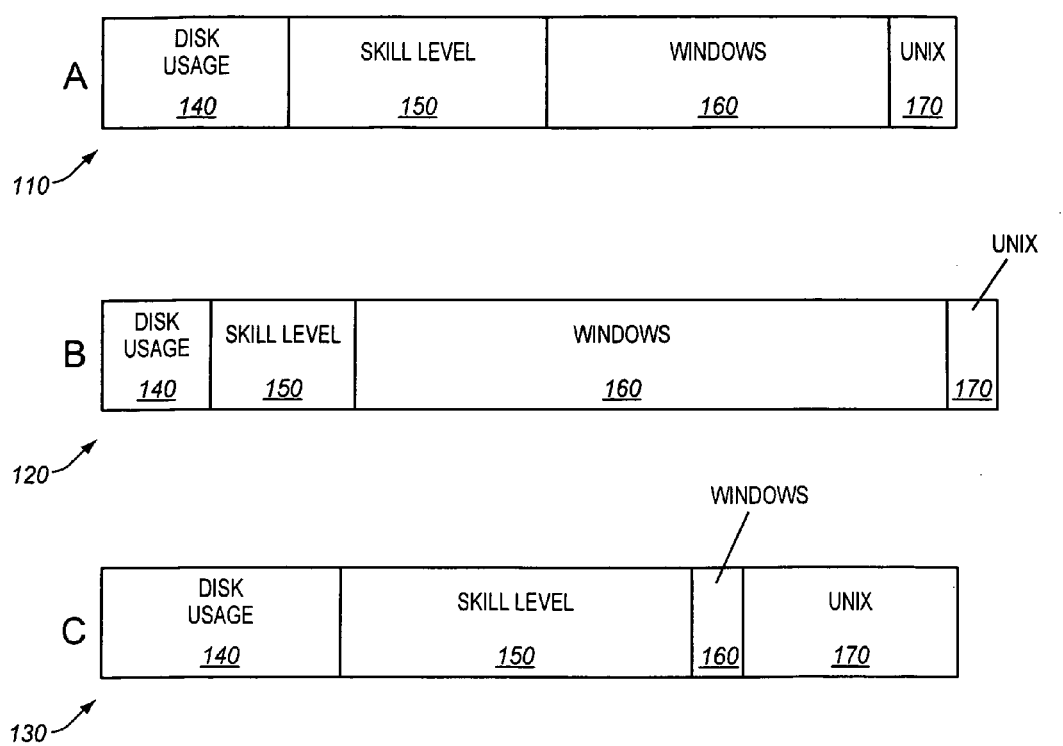
FIG. 1 is a block diagram of one embodiment of various exemplary archetypes of a data center.

A method and apparatus are described for rapid categorization of data center serviceability characteristics. According to one embodiment, the method includes identifying one or more variables of interest relating to serviceability of data centers, identifying one or more archetypal data center patterns using historical data for the one or more variables of interest, wherein the one or more archetypal data center patterns do not include mythical measurements, collecting data for the one or more variables of interest from a target data center, and determining a best match of the collected data from the target data center to one of the archetypal data center patterns.

In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention. The appearances of the phrase "in one embodiment" in various places in the specification are not necessarily all referring to the same embodiment.

Also, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions, to perform the operations. Alternatively, the operations may be performed by a combination of hardware and software.

Moreover, embodiments of the present invention may be provided as computer program products, which may include machine-readable medium having stored thereon instructions used to program a computer (or other electronic devices) to perform a process according to embodiments of the present invention. The machine-readable medium may include, but is not limited to, floppy diskettes, hard disk, optical disks, CD-ROMs, and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data. Moreover, data discussed herein may be stored in a single database, multiple databases, or otherwise in select forms (such as in a table).

Additionally, embodiments of the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Embodiments of the invention introduce a novel method for rapid categorization of data center serviceability characteristics. The basic concept of embodiments of the invention is that of rapid and accurate categorization of customer needs. If an organization's salesperson and/or technician are able to determine, from a few select data sources, how a customer's data center compares to other data centers with known serviceability and risk parameters, this can provide a basis for determining selection and pricing of services to meet customer needs.

The basis for this categorization is archetypal analysis. Archetypal analysis is a multivariate analysis technique which uncovers patterns in the data that describe prototypical mixtures of variables ("archetypes") in the data. These prototypical mixtures, or archetypes, are actual data that may occur and not impossible, or "mythical", measures.

FIG. 1 is a block diagram illustrating various exemplary archetypes of a data center according to one embodiment of the invention. In one embodiment, archetypal analysis of data center variables may result in three archetypes 110, 120, 130. The number of variables an archetype may assess, as well as the resulting number of archetypes, may be prescribed prior to the archetypal analysis and resulting determination of archetypes.

As illustrated in FIG. 1, an exemplary archetypal analysis for a data center may be based on variables of interest including disk usage 140, employee skill level 150, percentage Windows™ utilization 160, and percentage UNIX utilization 170. Three archetypes 110, 120, 130 are then created based on an archetypal analysis of historical data from data centers for the variables of interest. Each archetype A 110, B 120, and C 130 defines a specific mixture of data for the various variables 140-170. The archetypal analysis that created these archetypes 110-130 determined that the historical data best centered around these three mixtures of variables. It should be noted that the archetypal analysis results in data mixtures that are real-life measurements, and not impossible or "mythical" measurements.

Embodiments of the invention propose the use of archetypal analysis for data center serviceability provisioning. Specifically, archetypes of data centers may be created using an organization's large data sets of information related to data centers. These archetypes present specific mixtures of variables of interest, and may be used as a basis against which to compare new customer data centers. For example, if six archetypal data centers are identified, with each archetype representing a mixture of variables relating to serviceability, it would be possible to compare a new customer against these archetypes and determine the best match.

From this match, initial assumptions about serviceability requirements, service/product needs, and risk to service may be made. This would provide sufficient data to determine what bundles of products/services the customer will immediately need. Further delivery of products and services may be customized on an ongoing basis once telemetry data collection systems are installed at the customer site. As a side-benefit, this further analysis may be driven by the knowledge gathered through archetypal categorization.

Figure 2:
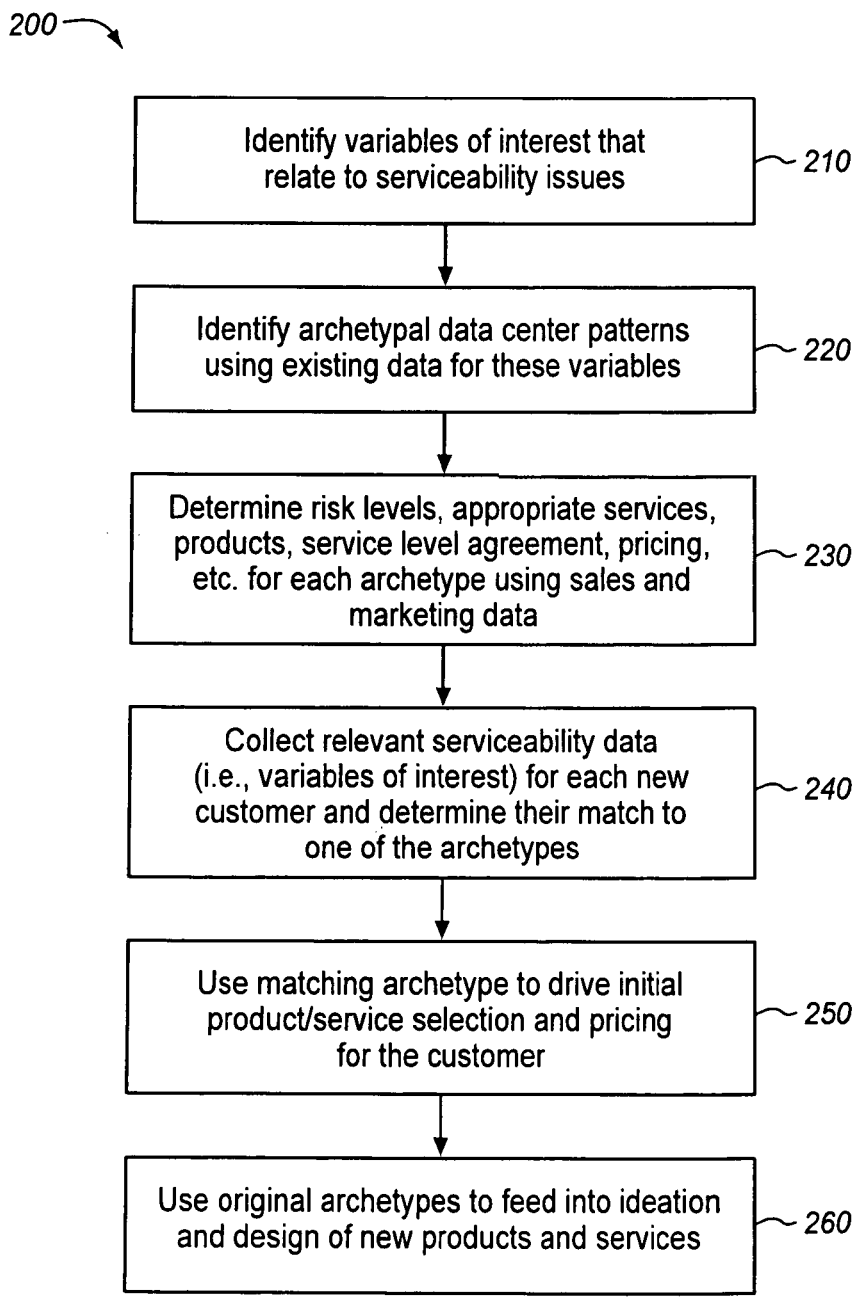
FIG. 2 is a flow diagram illustrating a method of one embodiment of the invention.

FIG. 2 is a flow diagram of a method according to one embodiment of the invention. The method is a process 200 for rapid categorization of data center serviceability characteristics. Process 200 begins at processing block 210, where variables of interest are identified that relate to serviceability issues. Then, at processing block 220, archetypal data center patterns are identified via archetypal analysis using existing data for these variables. In some embodiments, this existing data may come from databases, sales account information, or Sevenspace™, to name a few examples. The number of archetypes resulting from the analysis may be pre-determined. In some embodiments, a data set may be represented by fewer archetypes than there are variables of interest being measured.

At processing block 230, a determination of risk levels, appropriate services, products, service level agreements, and pricing recommendations for each archetype is made using sales and marketing data. Then, at processing block 240, relevant serviceability data is collected for each new customer so that each customer's match to one of the archetypes may be determined. The matching archetype is then used to drive initial product/service selection and pricing for the customer at processing block 250. Finally, at processing block 260, the original archetypes are used to feed into ideation and design of new products/services.

As a purely hypothetical example of the above process 200, an analysis of data centers may be made in terms of a variety of variables of interest. These variables may include homogeneity of system base, type of applications run, and availability requirements. The analysis may result in two archetypal data centers: (1) Archetype A has a large heterogeneous mix of systems, runs e-commerce applications, and has high availability requirements; (2) Archetype B also has a large heterogeneous mix of systems, but runs computationally intense applications (e.g., weather pattern predictions), and has lower availability requirements. It is determined through analysis of existing technical and sales data that data center archetype A will place greater demands on serviceability than archetype B.

Accordingly, a sales person/technician that visits a potential new customer may utilize these archetypes. As part of the pre-sales analysis and quote generation, data is collected on the three variables of interest. It is then determined that the new customer's data center appears to be closer in type to data center archetype A than to B. The quote to the customer may then include service level agreements, pricing and suggested products/services that have been predetermined to best meet the needs for type A data centers. As a result, provisioning time may be reduced.

It is important to note that the use of archetypal analysis may occur at any point in the customer engagement lifecycle. Archetypical analysis may be used as a way to rapidly determine characteristics at the start of the engagement, but this technique may also be used following interventions to determine if a data center has moved closer to a more desirable archetype (e.g., to one with low risk parameters). In addition, the use of archetypal analysis as a rapid categorization method does not preclude, and in fact would complement, the use of more detailed analysis, such as analysis of telemetry data, in understanding the customer's needs and how best to meet them.

Embodiments of the invention provide a novel approach to multivariate analysis of data centers. Firstly, traditional approaches to multivariate analysis are cumbersome. Traditional approaches have the weakness of potentially producing factors that are mythological and do not exist in the customer base (e.g., customers with negative network bandwidth, etc.). Archetypal analysis for data centers are presented herein avoids these pitfalls.

Secondly, embodiments of the invention propose assessment of serviceability, risk, and any other characteristic of interest in an automated manner. The approach is extensible in that any variable of interest may be added to the assessment without recreating the computational framework or the to-be-fit model. This is not the case with other traditional multivariate modeling techniques.

Finally, embodiments of the invention provide an intuitive and useful way to characterize large data sets with multiple variables as mixtures of, for example, three to six archetypes that characterize the data. These archetypes are so intuitive, in fact, that they may be used in a variety of areas, such as product/service designs, as marketing data to drive bundling of products/services, and to rapidly communicate to non-technical customers about the salient characteristics of their data centers.

Figure 3:
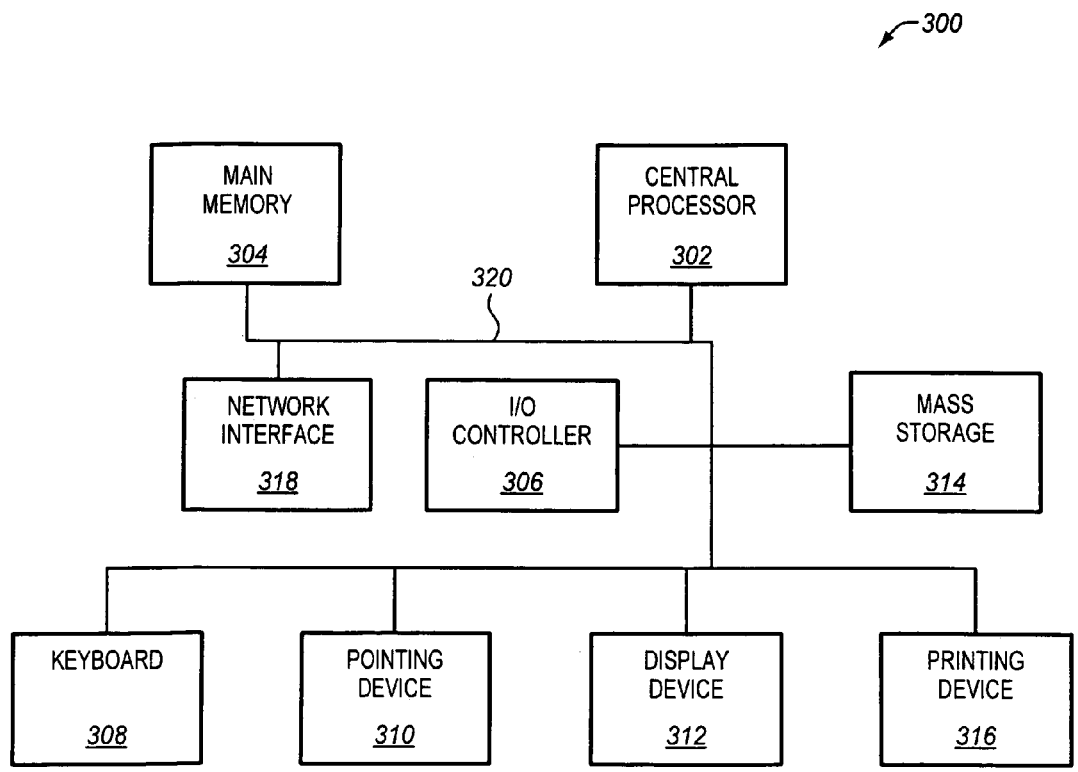
FIG. 3 is an illustration of an embodiment of a computer system.

FIG. 3 illustrates an exemplary computer system 300 in which certain embodiments of the present invention may be implemented. In one embodiment, the components of FIG. 3 may be perform process 200 described with respect to FIG. 2.

System 300 comprises a central processor 302, a main memory 304, an input/output (I/O) controller 306, a keyboard 308, a pointing device 310 (e.g., mouse, track ball, pen device, or the like), a display device 312, a mass storage 314 (e.g., a nonvolatile storage such as a hard disk, an optical drive, and the like), and a network interface 318. Additional input/output devices, such as a printing device 316, may be included in the system 300 as desired. As illustrated, the various components of the system 300 communicate through a system bus 320 or similar architecture.

In a further embodiment, system 300 may be a distributed computing system. In other words, one or more of the various components of the system 300 may be located in a physically separate location than the other components of the system 300. Such components may be accessed and connected via a network to the other components.

In accordance with an embodiment of the present invention, the computer system 300 includes a Sun Microsystems computer utilizing a SPARC microprocessor available from several vendors (including Sun Microsystems, Inc., of Santa Clara, Calif.). Those with ordinary skill in the art understand, however, that any type of computer system may be utilized to embody the present invention, including those made by Hewlett Packard of Palo Alto, Calif., and IBM-compatible personal computers utilizing Intel microprocessor, which are available from several vendors (including IBM of Armonk, N.Y.).

Also, instead of a single processor, two or more processors (whether on a single chip or on separate chips) can be utilized to provide speedup in operations. It is further envisioned that the processor 302 may be a complex instruction set computer (CISC) microprocessor, a reduced instruction set computing (RISC) microprocessor, a very long instruction word (VLIW) microprocessor, a processor implementing a combination of instruction sets, and the like.

The network interface 318 provides communication capability with other computer systems on a same local network, on a different network connected via modems and the like to the present network, or to other computers across the Internet. In various embodiments of the present invention, the network interface 318 can be implemented utilizing technologies including, but not limited to, Ethernet, Fast Ethernet, Gigabit Ethernet (such as that covered by the Institute of Electrical and Electronics Engineers (IEEE) 801.1 standard), wide-area network (WAN), leased line (such as T1, T3, optical carrier 3 (OC3), and the like), analog modem, digital subscriber line (DSL and its varieties such as high bit-rate DSL (HDSL), integrated services digital network DSL (IDSL), and the like), cellular, wireless networks (such as those implemented by utilizing the wireless application protocol (WAP)), time division multiplexing (TDM), universal serial bus (USB and its varieties such as USB II), asynchronous transfer mode (ATM), satellite, cable modem, and/or FireWire.

Moreover, the computer system 300 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), Macintosh operating system (Mac OS) (including Mac OS X), and the like. Also, it is envisioned that in certain embodiments of the present invention, the computer system 300 is a general purpose computer capable of running any number of applications such as those available from companies including Oracle, Siebel, Unisys, Microsoft, and the like.

Archetypal analysis applied to data center serviceability may provide many benefits. One benefit is rapid, cost-effective categorization of customer needs. Another benefit is improved speed in provisioning products and/or services to customers based on rapid assessment of needs, with subsequent ongoing customer analysis via telemetry and requirements analysis at later stages, to improve knowledge of serviceability parameters and customer needs.

Other benefits include: a way to understanding risk levels and risk types to drive negotiation of product and service agreements with customers; a basis for rapidly and accurately selecting specific products and services (and bundles) to meet customer needs at the beginning of a customer engagement; a foundation for new product/service ideation and design; a rapid way to determine whether interventions have had a desired effect over time; and an analysis method to characterize large data sets with results that correspond to actual customer needs in the real world.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The foregoing description has been directed to specific embodiments. It will be apparent to those with ordinary skill in the art that modifications may be made to the described embodiments, with the attainment of all or some of the advantages. Therefore, it is the object of the appended claims to cover all such variations and modifications as come within the spirit and scope of the invention.

What is claimed is:

1. A method for servicing a customer data center comprising:
   obtaining, by a hardware processor, a plurality of archetypal patterns corresponding to a plurality of data centers and comprising a plurality of disk usage values and a plurality of utilization percentages of a type of operating system;
   receiving, by the hardware processor, a request to analyze serviceability of the customer data center;
   identifying, by the hardware processor, a plurality of historical data items related to the customer data center;
   calculating, by the hardware processor and based on the plurality of historical data items, a customer utilization percentage of the customer data center and a customer disk usage value of the customer data center;
   matching, by the hardware processor, the customer utilization percentage to a first utilization percentage of the plurality of utilization percentages and the customer disk usage value to a first disk usage value of the plurality of disk usage values;
   identifying, by the hardware processor, a first archetypal pattern of the plurality of archetypal patterns comprising the first utilization percentage and the first disk usage value;
   identifying, by the hardware processor and based on the first archetypal pattern, a plurality of services required for servicing the customer data center;
   receiving, by the hardware processor and after the plurality of services are performed, a new plurality of historical data items from a telemetry device installed at the customer data center;
   calculating, by the hardware processor and based on the new plurality of historical data items, a new customer utilization percentage of the customer data center and a new customer disk usage value of the customer data center;
   matching, by the hardware processor, the new customer utilization percentage to a second utilization percentage of the plurality of utilization percentages and the new customer disk usage value to a second disk usage value of the plurality of disk usage values;
   identifying, by the hardware processor, a second archetypal pattern of the plurality of archetypal patterns comprising the second utilization percentage and the second disk usage value; and
   calculating, by the hardware processor, a new plurality of services required for servicing the customer data center.

2. The method of claim 1, further comprising recommending at least one from a group consisting of product selection, service selection, and pricing for the target customer data center based on the first archetypal pattern.

3. The method of claim 1, further comprising determining at least one from a group consisting of risk level, services, products, service level agreements, and pricing for each of the plurality of archetypal patterns using historical marketing data.

4. The method of claim 1, wherein the customer data center belongs to a new customer.

5. A computer-readable medium storing a plurality of instructions for servicing a customer data center, the plurality of instructions comprising functionality to:
   obtain a plurality of archetypal patterns corresponding to a plurality of data centers and comprising a plurality of disk usage values and a plurality of utilization percentages of a type of operating system;
   receive a request to analyze serviceability of the customer data center;
   identify a plurality of historical data items related to the customer data center;
   calculate, based on the plurality of historical data items, a customer utilization percentage of the customer data center and a customer disk usage value of the customer data center;
   match the customer utilization percentage to a first utilization percentage of the plurality of utilization percentages and the customer disk usage value to a first disk usage value of the plurality of disk usage values;
   identify a first archetypal pattern of the plurality of archetypal patterns comprising the first utilization percentage and the first disk usage value;
   identify, based on the first archetypal pattern, a plurality of services required for servicing the customer data center;
   receive, after the plurality of services are performed, a new plurality of historical data items from a telemetry device installed at the customer data center;
   calculate, based on the new plurality of historical data items, a new customer utilization percentage of the customer data center and a new customer disk usage value of the customer data center;
   match the new customer utilization percentage to a second utilization percentage of the plurality of utilization percentages and the new customer disk usage value to a second disk usage value of the plurality of disk usage values;
   identify a second archetypal pattern of the plurality of archetypal patterns comprising the second utilization percentage and the second disk usage value; and
   calculate, based on the second archetypal pattern, a new plurality of services required for servicing the customer data center.

6. The computer-readable medium of claim 5, further comprising:
   recommending at least one from a group consisting of product selection, service selection, and pricing for the customer data center based on the first archetypal pattern.

7. The computer-readable medium of claim 5, further comprising determining at least one from a group consisting of risk level, services, products, service level agreements, and pricing for each of the plurality of archetypal patterns using historical marketing data.

8. A system for servicing a customer data center, comprising:
   a hardware processor;
   a memory operatively connected to the hardware processor; and
   a plurality of software instructions stored in the memory and comprising functionality to:
      obtain a plurality of archetypal patterns corresponding to a plurality of data centers and comprising a plurality of disk usage values and a plurality of utilization percentages of a type of operating system;
      receive a request to analyze serviceability of the customer data center;
      identify a plurality of historical data items related to the customer data center;
      calculate, based on the plurality of historical data items, a customer utilization percentage of the customer data center and a customer disk usage value of the customer data center;

match the customer utilization percentage to a first utilization percentage of the plurality of utilization percentages and the customer disk usage value to a first disk usage value of the plurality of disk usage values;

identify a first archetypal pattern of the plurality of archetypal patterns comprising the first utilization percentage and the first disk usage value;

identify, based on the first archetypal pattern, a plurality of services required for servicing the customer data center;

receive, after the plurality of services are performed, a new plurality of historical data items from a telemetry device installed at the customer data center;

calculate, based on the new plurality of historical data items, a new customer utilization percentage of the customer data center and a new customer disk usage value of the customer data center;

match the new customer utilization percentage to a second utilization percentage of the plurality of utilization percentages and the new customer disk usage value to a second disk usage value of the plurality of disk usage values;

identify a second archetypal pattern of the plurality of archetypal patterns comprising the second utilization percentage and the second disk usage value; and calculate, based on the second archetypal pattern, a new plurality of services required for servicing the customer data center.

9. The system of claim 8, wherein the plurality of software instructions further comprise functionality to: recommend, based on the first archetypal pattern, at least one from a group consisting of product selection, service selection, and pricing for the customer data center.

10. The system of claim 8, wherein the plurality of software instructions further comprise functionality to: determine at least one from a group consisting of risk level, services, products, service level agreements, and pricing for each of the plurality of archetypal patterns using historical marketing data.

\* \* \* \* \*